(12) United States Patent
Rieger

(10) Patent No.: US 9,044,804 B2
(45) Date of Patent: Jun. 2, 2015

(54) CORRUGATED TUBING COMPRESSION TOOL

(76) Inventor: Harry P. Rieger, Yorba Linda, CA (US)

( * ) Notice: Subject to any disclaimer, the term of this patent is extended or adjusted under 35 U.S.C. 154(b) by 463 days.

(21) Appl. No.: 13/493,226

(22) Filed: Jun. 11, 2012

(65) Prior Publication Data

US 2013/0327108 A1    Dec. 12, 2013

(51) Int. Cl.
 *B21D 41/02*    (2006.01)
 *B21D 19/00*    (2006.01)
 *B23B 5/16*    (2006.01)

(52) U.S. Cl.
 CPC ............ *B21D 41/021* (2013.01); *B21D 19/005* (2013.01); *B23B 5/16* (2013.01)

(58) Field of Classification Search
 CPC ...... B21D 19/00; B21D 19/005; B21D 19/08; B21D 41/021; B21D 41/025; B23B 5/16; B23B 5/167
 USPC ...................... 72/316–318, 370.11
 See application file for complete search history.

(56) References Cited

U.S. PATENT DOCUMENTS

| 3,194,040 | A |   | 7/1965 | Rasmussen |       |
|-----------|---|---|--------|-----------|-------|
| 3,913,364 | A | * | 10/1975 | Strybel  | 72/318 |
| 7,318,334 | B2 | * | 1/2008 | Carter   | 72/317 |
| 2006/0117827 | A1 |  | 6/2006 | Kao    |       |

FOREIGN PATENT DOCUMENTS

| CN | 101234535 | 8/2008 |
| CN | 201427156 | 3/2010 |

* cited by examiner

*Primary Examiner* — Debra Sullivan
(74) *Attorney, Agent, or Firm* — Morland C. Fischer

(57) ABSTRACT

A compression tool for compressing and flattening one or both ends of a length of corrugated tubing commonly used for making solar installations. A threaded force-transmitting driver is located within a threaded bore of a force-transmission cylinder. A clamp is disposed in surrounding engagement with the corrugated tubing. Tube retaining lips of the clamp are received between an adjacent pair of corrugatings to hold one end of the corrugated tubing in stationary axial alignment with the force-transmitting driver. A rotational force applied to the threaded force-transmitting driver causes the driver to rotate and move through the threaded bore of the force-transmission cylinder. A compression head at the front of the driver is correspondingly moved towards and into contact with the end of the tubing to compress and flatten the end to prevent a nut from sliding off the tubing.

8 Claims, 3 Drawing Sheets

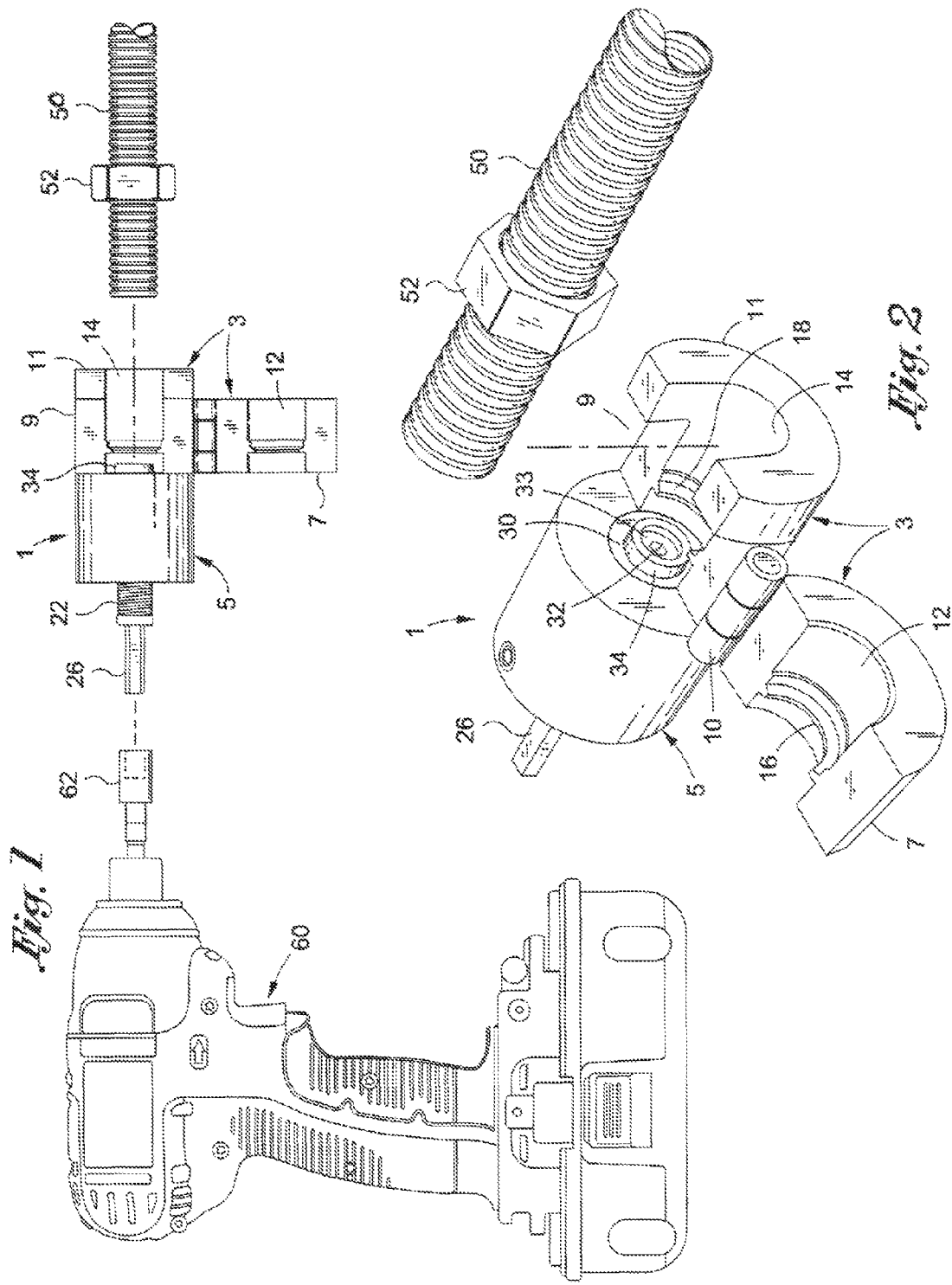

CORRUGATED TUBING COMPRESSION TOOL

BACKGROUND OF THE INVENTION

1. Field of the Invention

This invention relates to a hand-held tool to compress and flatten one or both ends of a section of corrugated (e.g., stainless steel) tubing of the kind that is commonly used in the solar energy industry. By virtue of the foregoing, a threaded fastener (e.g., a nut) carried by the corrugated tubing will be unable to slide off the compressed end of the tubing during transport or installation.

2. Background Art

It is often desirable to flare (i.e., widen) at least one end of metal tubing which is surrounded by a nut that is slidable along the tubing. The nut is a fastener that is intended to be connected to a complementary fastener so that the tubing can be coupled to an adjacent section of tubing or a fitting. Without having a flared or relatively wide end, the nut could inadvertently slide off the tubing during transport or installation.

A commonly used technique to flare the end of metal tubing is to strike the end with a hammer. However, the hammer striking force is sometimes uneven which may actually damage the tubing and make it unsuitable for coupling to another tube or fitting. In this same regard, a non-uniform flared end produced by a hammer strike may require the use of an additional slip ring to prevent a loss of pressure at the intersection of the coupled tubing sections.

Another technique to widen the end of metal tubing is to use silicone compression and isolation rings around the tube end. Such silicone compression and isolation rings are relatively expensive and are subject to cracking following their prolonged use under high temperature, pressure and mechanical stress conditions.

What is more, a section of metal tubing that is cut from tubing stock will typically have a jagged end surrounded by sharp burs. Such burs are known to cut washers and other seals that are used when adjacent tubing sections are coupled to one another. A seal which is cut will produce leaks and require repair. None of the known commonly-employed metal tube flaring techniques is adapted to simultaneously widen the cut end of the tubing and remove burs therefrom.

SUMMARY OF THE INVENTION

In general terms, disclosed herein is a hand-held compression tool for use in compressing and flattening one or both ends of a section of (e.g., stainless steel) corrugated tubing commonly used in solar energy installations. The compressed end of the tubing prevents a nut that is carried by the tubing from sliding off the tubing during transport or installation. The compression tool includes a tube clamp at one end thereof and a force transmission cylinder at the opposite end.

The tube clamp includes upper and lower cradles which are hingedly connected together and rotatable one above the other to surround and capture the corrugated tubing section to be compressed. Tube retaining lips which project from the upper and lower cradles are received between an adjacent pair of corrugations of the tubing to hold the tubing in stationary axial alignment with the force-transmission cylinder.

The force-transmission cylinder has a threaded bore running axially therethrough for receipt of a correspondingly threaded force-transmitting driver. Located at the front of the force-transmitting driver is a compression head. A deburring rim projects outwardly from the compression head. Located at the rear of the force-transmitting driver is a spindle adapted to be coupled to the socket of an impact wrench.

In operation, the upper and lower cradles of the tube clamp of the compression tool are rotated into surrounding engagement with the corrugated tubing section so as to hold the end thereof to be compressed to spaced axial alignment with the threaded force-transmitting driver of the force-transmission cylinder. The spindle of the force-transmitting driver is coupled to the socket of the power wrench. The power wrench is energized to apply a rotational force to the force-transmitting driver to cause the driver to correspondingly move axially through the threaded bore of the force-transmission cylinder. Accordingly, the compression head of the driver is moved towards and into contact with the tubing section, whereby to compress and flatten the end thereof. The deburring rim which moves with the compression head is received inwardly of the tubing section to automatically and simultaneously smooth any burs that are formed at the compressed end.

BRIEF DESCRIPTION OF THE DRAWINGS

FIG. 1 is an exploded view showing a corrugated tubing compression tool according to a preferred embodiment of this invention with a section of corrugated tubing to be compressed and an impact wrench;

FIG. 2 shows the section of corrugated tubing to be compressed being received by a tube clamp of the compression tool of FIG. 1;

DESCRIPTION OF THE PREFERRED EMBODIMENT

Figure 3:
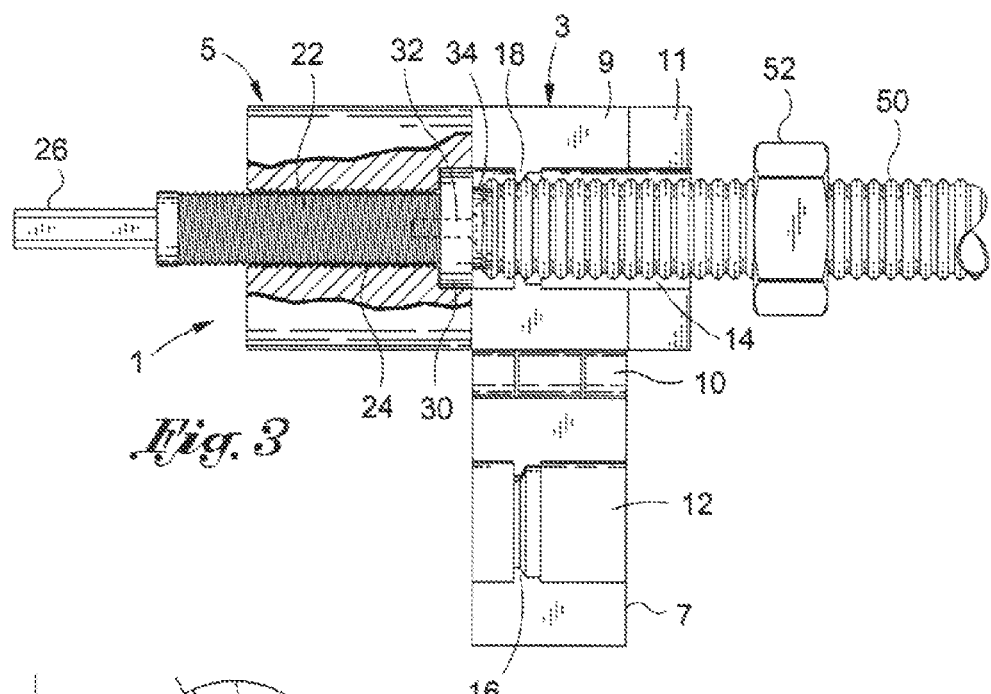
FIG. 3 shows the section of corrugated tubing to be compressed being held in stationary axial alignment by the tube clamp with a force-transmitting driver of a force-transmission cylinder of the compression tool.

Referring concurrently to FIGS. 1-6 of the drawings, details are provided for an easy-to-use hand-held compression tool 1 that has particular application for compressing one or both ends of a section of corrugated stainless steel tubing 50 so as to prevent a chrome-plated brass nut 52, or the like, from sliding off an end of the tubing 50 during transport or installation. Such corrugated tubing 50 is commonly used in solar energy installations, such as for coupling a roof-mounted solar collector to a remote storage tank. However, it is to be understood that the compression tool 1 herein disclosed can be used in combination with any corrugated stainless steel, copper and similar tubing to be used in a variety of (e.g., plumbing, hydraulic, thermal, etc.) applications.

According to the preferred embodiment, a tube clamp 3 is located at one end of the compression tool 1. A force-transmission cylinder 5 is located at the opposite end of the tool 1. The clamp 3 and cylinder 5 are preferably manufactured from forged steel, although the material from which the tool 1 is made should not be considered a limitation of this invention. As will soon be described, the tube clamp 3 is adapted to surround and capture the section of corrugated tubing 50 to be compressed. The force-transmission cylinder 5 of tool 1 guides a driver towards and against one end of the tubing 50 that is captured by clamp 3 so that the one end can be compressed and widened to form a stop to engage and block the nut 52 from sliding off the tubing 50.

The tube clamp 3 of compression tool 1 includes an upper cradle 7 and a lower cradle 9. The upper and lower cradles 7 and 9 are pivotably connected to one another by a conventional hinge 10 such that the upper cradle 7 is rotatable relative to the lower cradle 9 between an open position (best shown in FIG. 2) and a closed position (best shown in FIG. 5). In the open position, the upper cradle 7 is rotated off and away from the lower cradle 9 at which time the corrugated tubing 50 can be moved into or out of receipt by the tube clamp 3. In the closed position, the upper cradle 7 is rotated towards and over top of the lower cradle 9 at which time the tubing 50 is surrounded and captured by the tube clamp 3. The lower cradle has a wide extension or tail 11 to reinforce the hinge 10 and prevent a dislocation thereof during the compression of the tubing 50.

The upper and lower cradles 7 and 9 of tube clamp 9 have respective smooth and generally round interior cavities 12 and 14 that are sized and shaped to accommodate the corrugated tubing 50 therewithin. Thus, with the upper cradle 7 rotated to the closed position over the lower cradle 9, the tube clamp 3 will lie in surrounding engagement with the corrugated tubing 50 to prevent a displacement thereof and hold the tubing in axial alignment with a soon-to-be described driver 22 that is guided by the force-transmission cylinder 5 towards one end of the tubing 50 to be compressed.

Figure 5:
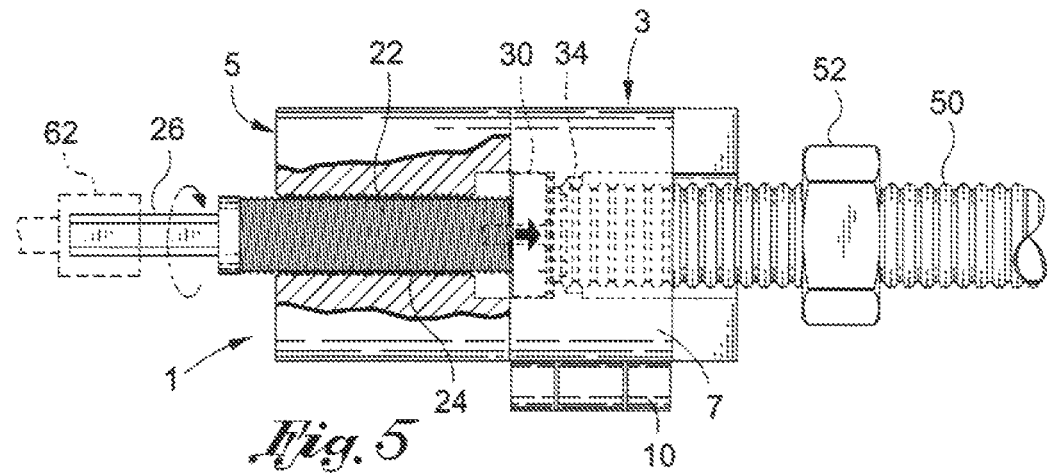
FIG. 5 shows a compression head connected to the force-transmission driver moving with the driver towards and into contact with the corrugated tubing in response to the rotational force being applied by the impact wrench to the driver.

To this end, a respective tube retaining lip 16 and 18 lies within and extends outwardly from each of the interior cavities 12 and 14 of the upper and lower cradles 7 and 9. When the upper cradle 7 is rotated to the closed position over the lower cradle 9, the tube retaining lips 16 and 18 thereof will lie opposite and face one another. As is best shown in FIG. 5, the outwardly extending lips 16 and 18 are positioned between a pair of adjacent corrugations of the tubing 50 so as to prevent an axial displacement of the tubing relative to the force-transmission cylinder 5. The lips 16 and 18 are arranged within the cavities 12 and 14 of the upper and lower cradles 7 and 9 so as to be received between an adjacent pair of the first few corrugations formed at the end of the tubing 50 to be compressed.

A threaded force-transmitting driver 22 is mated to a correspondingly threaded bore 24 that runs axially through the force-transmission cylinder 5 of the compression tool 1. With the force-transmitting driver 22 received by the bore 24 of cylinder 5 and the corrugated tubing 50 received by the tube clamp 3, the driver 22 and tubing 50 will be held in axial alignment (best shown in FIG. 3).

Connected to and projecting from the rear of the force-transmitting driver 22 is a spindle 26. The spindle 26 enables the force-transmitting driver 22 to be coupled to an impact wrench 60 or a similar force-generating tool for a purpose that will soon be described. Connected to the front of the driver 22 is a compression head 30. The compression head 30 may be detached from the driver 22 and replaced with a head having a different size. As will also soon be described, the compression head 30 is movable towards the corrugated tubing 50 so that a compressive force can be applied to the leading end thereof which has been surrounded and captured by the tube clamp 3 of the compression tool 1. That is, rotational and pushing forces generated by the impact wrench 60 are transmitted to the compression head 30 by way of the force-transmitting driver 22.

Attached to the compression head 30 by means of a suitable removable fastener (e.g., a screw) 32 is a deburring face 33 that is surrounded by a deburring rim 34 (best shown in FIG. 2). The deburring rim 34 cooperates with the compression head 30 to smooth out and eliminate any burs from the leading end of the tubing 50 at the same time that the leading end is being compressed by the compression head 30. The deburring rim 34 is sized and (cylindrically) shaped so as to be able to move towards and inside the leading end of the corrugated tubing 50 while the leading end is being compressed.

The operation of the compression tool 1 for compressing one or both ends of the section of corrugated tubing 50 is now described while continuing to refer to FIGS. 1-6 of the drawings. With the upper cradle 7 of the tube clamp 3 rotated to the open position, the tubing 50 is laid within the interior cavity 14 of the lower cradle 9. The upper cradle 7 is then rotated at hinge 10 to the closed position to lay over top the lower cradle 9 and thereby surround the tubing 50. When the upper cradle 7 is rotated to the closed position, the tubing 50 is also received within the interior cavity 12 of cradle 7 so that the tube retaining lips 16 and 18 which extend from respective cavities 12 and 14 are received between a pair of adjacent corrugations of the tubing. As earlier explained, the retaining lips 16 and 18 hold the corrugated tubing 50 in place within the tube clamp 3 and prevent an axial displacement of the tubing relative to the force-transmitting cylinder 5 of the compression tool 1 during the steps of compressing and deburring the tubing.

Figure 4:
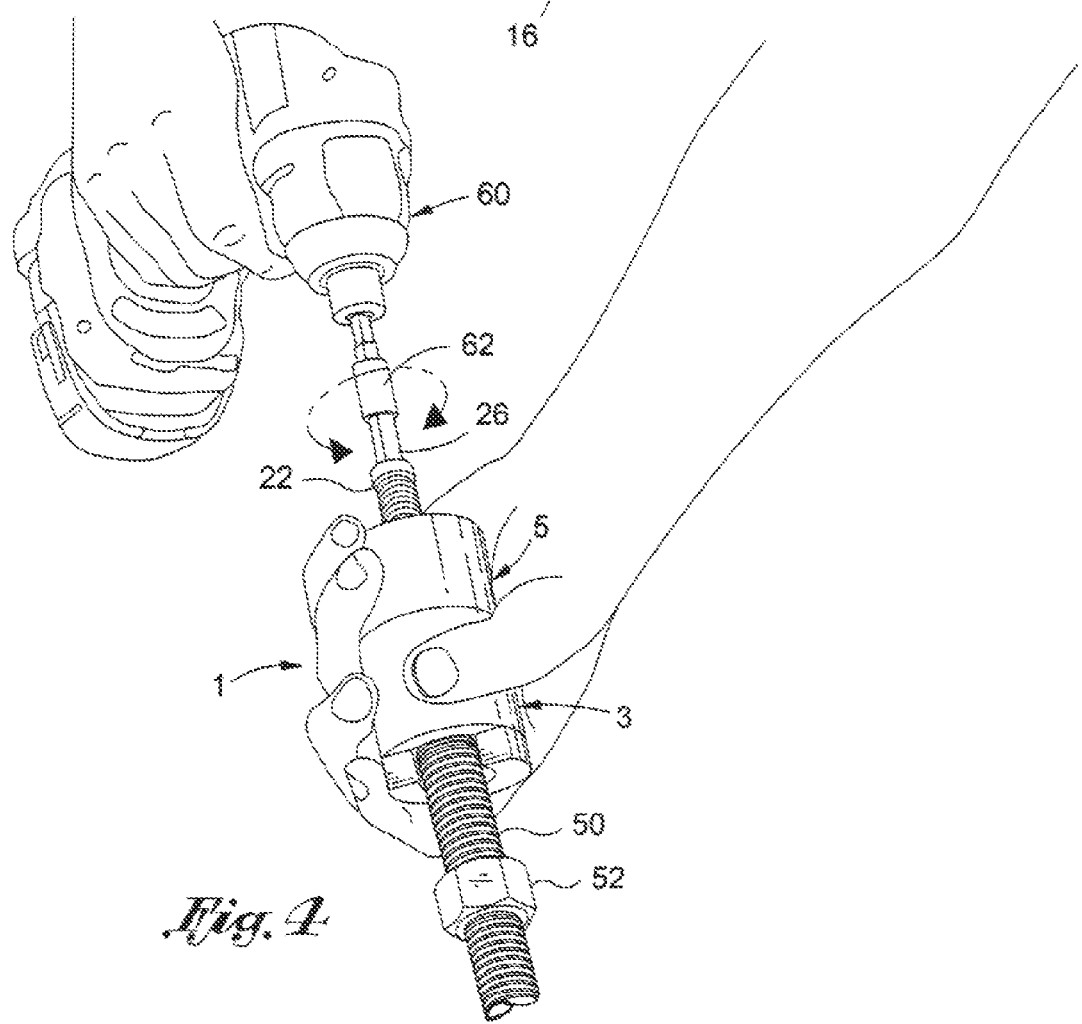
FIG. 4 shows the impact wrench coupled to and applying a rotational force to the force-transmitting driver of the force-transmission cylinder.

The impact wrench 60 is coupled to the compression tool 1 when the spindle 26 at the rear of the force-transmitting driver 22 of the force-transmission cylinder 5 is mated to a socket 62 of the wrench. By way of example, the impact wrench 60 is a ¼ inch, 18 volt tool. As is best shown in FIG. 4, the wrench 60 is held in one hand, and the compression tool 1 is grasped in the other. When the trigger of the wrench 60 is depressed and the wrench is pushed towards the tool 1, rotational and pushing forcers are transferred from the socket 62 of wrench 60 to the spindle 26. Accordingly, the threaded force-transmitting driver 22 is moved in a first direction axially through the threaded bore 24 of the force-transmission cylinder 5 towards the corrugated tubing 50 that is captured and held in place by the tube clamp 3 (best shown in FIG. 5).

Figure 6:
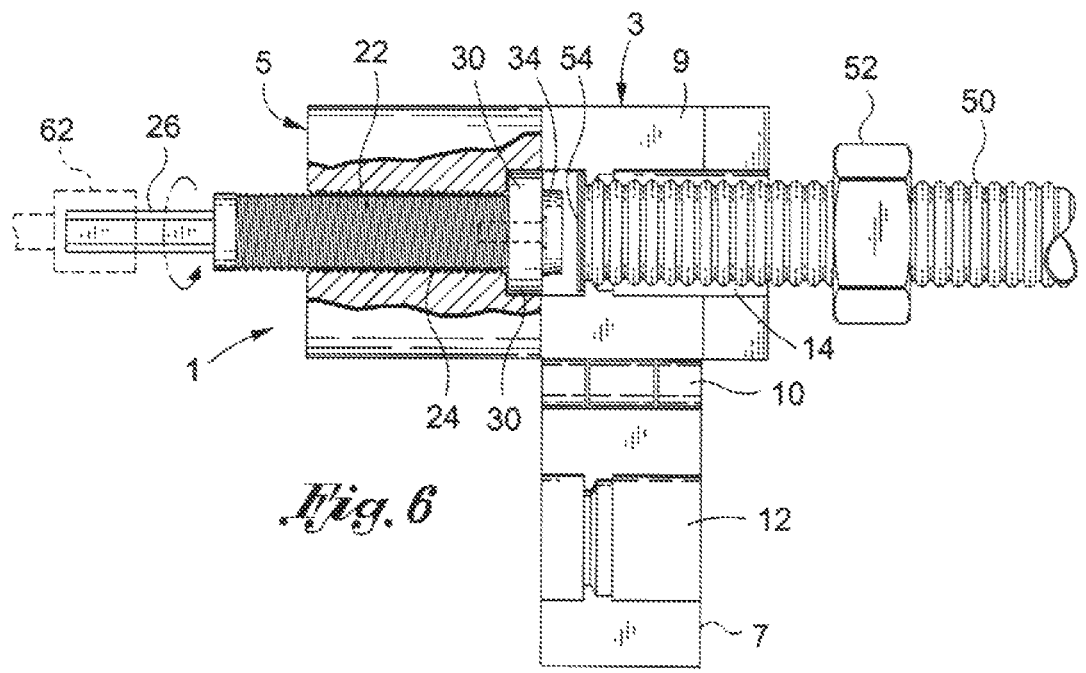
FIG. 6 shows the compression head of the force-transmitting driver moving with the driver away from the corrugated tubing after the tubing has been compressed.

The compression head 30 at the front of the force-transmitting driver 22 is correspondingly moved towards and forced against the leading end of the corrugated tubing 50, whereby to compress and flatten the leading end to create a relatively wide head 54 (best shown in FIG. 6). At the same time that the tubing 50 is compressed, the deburring rim 34 that is connected to and moved with the compression head 30 is rotated inside the leading end of the tubing 50 (also best shown in FIG. 5) so as to simultaneously smooth out any burs created when the section of tubing is cut off tubing stock.

After compressing and deburring the leading end of the corrugated tubing 50, the impact wrench 60 is used to rotate the compression head 30 and deburring rim 34 at the front of the force-transmitting driver 22 away from the tubing 50. That is, the spindle 26 at the rear of the force-transmitting driver 22 is rotated in an opposite direction. Accordingly, the threaded force-transmitting driver 22 is moved axially and in a correspondingly opposite direction through the threaded bore 24 of the force-transmission cylinder 5 (best shown in FIG. 6). The upper cradle 7 of the tube clamp 3 may now be rotated at hinge 10 off the lower cradle 9 so that the wide headed corrugated tubing 50 can be removed from the compression tool 1.

The tubing 50 can then be returned to the tool 1 with the trailing end thereof captured and held in place by the tube clamp 3 in spaced axial alignment with the compression head 30 of the force-transmitting driver 22 of the force-transmission cylinder 5 in order to compress, flatten and debur the trailing end in the same manner as described above.

Figure 7:
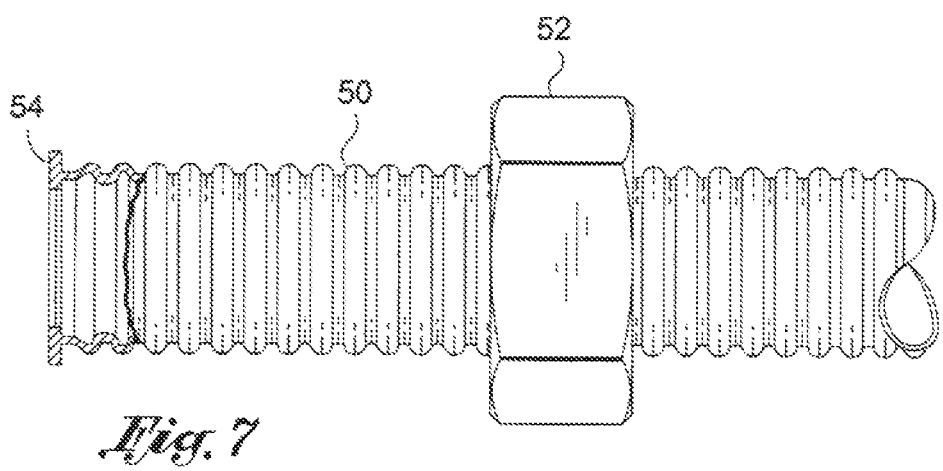
FIG. 7 shows one end of the section of corrugated tubing after the end has been compressed and flattened by means of the compression tool.

FIG. 7 of the drawings shows the section of corrugated tubing 50 after the flat and relatively wide compressed head 54 has been formed at one end thereof by the compression tool 1. The compressed end of tubing 50 can be coupled to an adjacent thermal tubing or fitting by means of sliding the nut 52 down the tubing 50 and into surrounding mating engagement with a threaded male connector (not shown) of the other tubing or fitting. A high temperature sealing washer may be required between the nut 52 and the male connector depending upon application. The interconnection of the headed tubing 50 and the adjacent thermal tubing or fitting has been demonstrated to sustain working temperatures of greater than 300° F. and working pressures of 1200 psi.

The invention claimed is:

1. A compression tool for compressing and flattening a first end of corrugated tubing having a series of corrugations running along the outside thereof, said compression tool comprising:
    a force-transmission body having a threaded bore running therethrough and a correspondingly threaded force-transmitting driver received by said threaded bore, said force-transmitting driver having a compression head at the front thereof and a coupler at the rear;
    a deburring rim carried by said compression head at the front of the threaded force-transmitting driver of said force-transmitting body so that said deburring rim lies in front of said compression head; and
    a clamp to hold the first end of said corrugated tubing in stationary axial alignment with the compression head of said force-transmitting driver,
    such that a rotational force applied to the coupler at the rear of said force-transmitting driver causes said force-transmitting driver to rotate and move axially through the threaded bore of said force-transmission body, whereby the compression head at the front of said force-transmitting driver is correspondingly moved towards and into contact with the first end of the corrugated tubing to compress and flatten said first end, said deburring rim moving with said compression head so as to lie inwardly of and rotate within the first end of the corrugated tubing to remove burs therefrom at the same time that said compression head compresses and flattens said first end.

2. The compression tool recited in claim 1, wherein said clamp includes a tube retaining lip to be located between an adjacent pair of the series of corrugations along the tubing in order to hold the first end of said tubing in said axial alignment with the compression head of said force-transmitting driver.

3. The compression tool recited in claim 2, wherein said clamp includes at least one cradle within which to receive the corrugated tubing, said tube retaining lip lying within said cradle for receipt between said adjacent pair of corrugations along said tubing.

4. The compression tool recited in claim 2, wherein said clamp includes a pair of cradles to be located in surrounding engagement with the corrugated tubing, each of said pair of cradles having a round cavity within which to receive said tubing, and at least one of said cavities having said tube retaining lip lying therewithin for receipt between said adjacent pair of corrugations along said tubing.

5. The compression tool recited in claim 4, wherein said pair of cradles are connected together at a hinge such that said pair of cradles are rotatable at said hinge one over the other and into said surrounding engagement with said tubing.

6. The compression tool recited in claim 1, wherein the coupler at the rear of said force-transmitting driver of said force-transmission body is a spindle extending outwardly from said driver to receive said rotational force.

7. The compression tool recited in claim 6, wherein said spindle is adapted to be coupled to an electrically-powered impact wrench to receive said rotational force from said impact wrench.

8. A method for compressing and flattening a first end of corrugated tubing having a series of corrugations running therealong, said method comprising the steps of:
    locating a threaded force-transmitting driver within a correspondingly threaded bore of a force-transmission body;
    connecting a deburring rim to the front of the force-transmitting driver so that said deburring rim is carried by said driver;
    holding the first end of the corrugated tubing in stationary axial alignment with said force-transmitting driver and the deburring rim carried thereby by engaging said tubing at a location between an adjacent pair of the series of corrugations thereof; and
    rotating said threaded force-transmitting driver for causing said driver to move axially through the threaded bore of said force-transmission body, whereby the force-transmitting driver is moved towards and into contact with the first end of the corrugated tubing for compressing and flattening said first end and the deburring rim connected to the front of said force-transmitting driver is correspondingly moved inwardly of the first end of the corrugated tubing so as to rotate and remove burs therefrom at the same time that said force-transmitting driver compresses and flattens said first end.

\* \* \* \* \*